No. 805,343. PATENTED NOV. 21, 1905.
J. L. CLARK.
FLUE STOPPER.
APPLICATION FILED SEPT. 22, 1904.
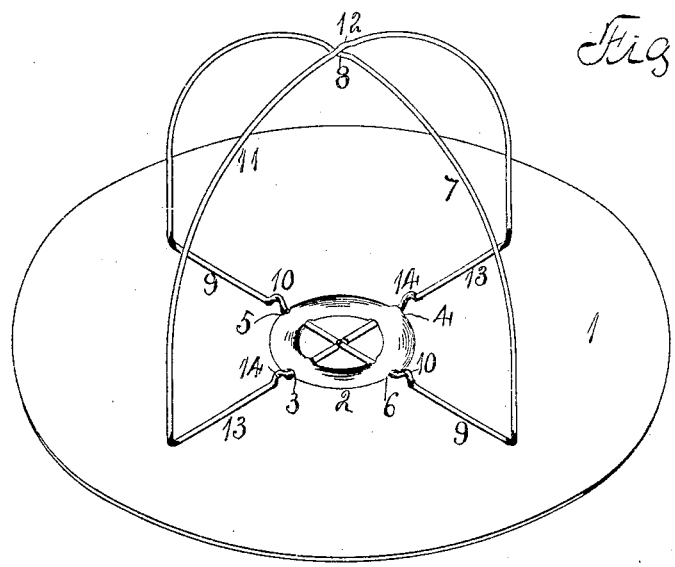
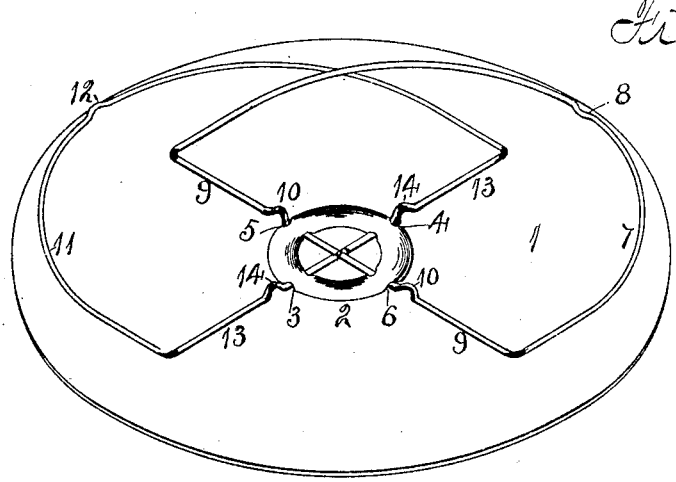
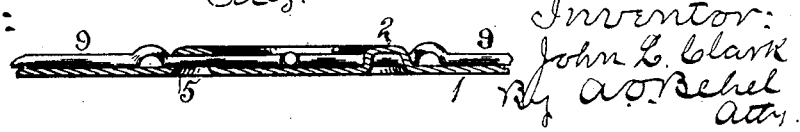
Witnesses:
Inventor:
John L. Clark

UNITED STATES PATENT OFFICE.

JOHN L. CLARK, OF ROCKFORD, ILLINOIS.

FLUE-STOPPER.

No. 805,343.          Specification of Letters Patent.          Patented Nov. 21, 1905.

Application filed September 22, 1904. Serial No. 225,528.

*To all whom it may concern:*

Be it known that I, JOHN L. CLARK, a citizen of the United States, residing at Rockford, in the county of Winnebago and State of Illinois, have invented certain new and useful Improvements in Flue-Stoppers, of which the following is a specification.

This invention relates to improvements in flue-stoppers in which a pair of bails have a pivotal connection with the plate in a manner that they may be folded for shipment and extended for use.

In the accompanying drawings, Figure 1 is an isometrical representation of the flue-stopper in which the bails are extended. Fig. 2 is a similar representation, in which the bails are folded. Fig. 3 is a section through the connection of the bails with the plate.

The plate 1 is provided with a circular raised portion 2, through which are formed four openings 3, 4, 5, and 6, radiating from the center of the plate.

The bail 7 has a central depression 8, and the end sections 9 lie in contact with the face of the plate 1. A short distance from the ends of the bail are formed offsets 10. This bail has its free ends located in the two radial openings 5 and 6.

The bail 11 has a central raised portion 12, and the end sections 13 lie in contact with the face of the plate 1. A short distance from the ends of the bail are formed offsets 14. This bail has its free ends located in the two radial openings 3 and 4.

The offsets of the bails come in contact with the outer ends of the radial openings through the raised circular portion 2, thereby limiting their inward movements. Those sections of the bails lying in contact with the plate serve to make a firm bearing for the bails.

The raised portion 12 of the bail 11 enters the depression 8 of the bail 7 when the bails are extended and forms a lock connection between the bails when they are extended.

I claim as my invention—

1. A flue-stopper comprising a plate having near its center an annular upstanding rib or bead stamped up therefrom, said rib or bead provided with two pairs of alined openings extending transversely therethrough in the plane of a face of the plate, one pair of said openings being arranged at right angles to the other pair, and two bails pivotally connected with said plate at right angles to one another, each bail consisting of a semicircular section having inwardly-directed legs which extend through the alined openings in the upstanding rib or bead, and rest in flat contact with the face of the plate throughout their length.

2. A flue-stopper comprising a plate having near its center a raised annular rib or bead provided with two pairs of alined openings, one pair of said openings being arranged at right angles to the other pair, and two bails pivotally connected to said plate at right angles to each other, each bail consisting of a semicircular section having inwardly-directed legs which extend through the alined openings in the said raised rib or bead, and rest in flat contact with the face of the plate throughout their length, and each leg having an offset or crimp intermediate its ends.

JOHN L. CLARK.

Witnesses:
    A. O. BEHEL,
    E. BEHEL.